(12) United States Patent
Davidson et al.

(10) Patent No.: US 9,482,117 B2
(45) Date of Patent: Nov. 1, 2016

(54) SYSTEMS AND METHODS FOR POWER PEAKING WITH ENERGY STORAGE

(71) Applicants: Chal S. Davidson, Bremerton, WA (US); Steven A. Wright, Albuquerque, NM (US)

(72) Inventors: Chal S. Davidson, Bremerton, WA (US); Steven A. Wright, Albuquerque, NM (US)

(73) Assignee: SuperCritical Technologies, Inc., Bremerton, WA (US)

( * ) Notice: Subject to any disclaimer, the term of this patent is extended or adjusted under 35 U.S.C. 154(b) by 0 days.

(21) Appl. No.: 14/283,671

(22) Filed: May 21, 2014

(65) Prior Publication Data
US 2015/0069758 A1 Mar. 12, 2015

Related U.S. Application Data

(60) Provisional application No. 61/956,077, filed on May 31, 2013.

(51) Int. Cl.
*F25B 25/00* (2006.01)
*F01K 3/00* (2006.01)
(Continued)

(52) U.S. Cl.
CPC ............. *F01K 25/103* (2013.01); *F01D 15/10* (2013.01); *F01K 3/00* (2013.01); *F01K 3/02* (2013.01);
(Continued)

(58) Field of Classification Search
CPC ..... F25B 25/00; Y02E 10/46; Y02E 60/142; Y02E 70/30; F01K 3/00; F01K 25/10; F01K 3/12; F01K 25/103; F01K 3/02; F01K 7/16; F01D 15/10; G05D 7/0617
USPC .......................................................... 60/659
See application file for complete search history.

(56) References Cited

U.S. PATENT DOCUMENTS 4,079,591 A * 3/1978 Derby .................... F03G 6/065
126/573
4,347,711 A * 9/1982 Noe ....................... F01K 23/101
60/39.181

(Continued)

FOREIGN PATENT DOCUMENTS

EP 2587005 A1 5/2013
JP 09-032577 2/1997

OTHER PUBLICATIONS

PCT International Search Report mailed Aug. 22, 2014, PCTPatent Application PCT/US2014/039130.
(Continued)

*Primary Examiner* — Nicholas J Weiss
*Assistant Examiner* — Wesley Harris
(74) *Attorney, Agent, or Firm* — Robert R. Richardson, P.S.

(57) ABSTRACT

Disclosed illustrative embodiments include systems and methods for power peaking with energy storage. In an illustrative, non-limiting embodiment, a power plant includes a thermodynamic piping circuit having a working fluid contained therein, and the working fluid has a flow direction and a flow rate. Power plant components are interposed in the thermodynamic piping circuit. The power plant components include a compressor system, a recuperator system, a heat source, a turbine system, a heat rejection system, and a thermal energy storage system. A valving system is operable to selectively couple the heat rejection system, the thermal energy storage system, and the compressor system in thermohydraulic communication with the working fluid maintaining the flow direction and the flow rate to implement a thermodynamic cycle chosen from a Brayton cycle, a combination Brayton cycle/refrigeration cycle, and a Rankine cycle.

23 Claims, 10 Drawing Sheets

(51) Int. Cl.
  *F01K 25/10* (2006.01)
  *F01K 3/12* (2006.01)
  *F01D 15/10* (2006.01)
  *F01K 25/08* (2006.01)
  *F01K 3/02* (2006.01)
  *F01K 7/16* (2006.01)
  *G05D 7/06* (2006.01)
  *F01K 3/16* (2006.01)

(52) U.S. Cl.
  CPC . *F01K 3/12* (2013.01); *F01K 3/16* (2013.01); *F01K 7/16* (2013.01); *F01K 25/10* (2013.01); *F25B 25/00* (2013.01); *G05D 7/0617* (2013.01); *Y02E 10/46* (2013.01); *Y02E 60/142* (2013.01); *Y02E 70/30* (2013.01)

(56) References Cited

U.S. PATENT DOCUMENTS

| | | | |
|---|---|---|---|
| 2004/0128975 A1* | 7/2004 | Viteri | F01K 25/005 60/39.55 |
| 2007/0151244 A1 | 7/2007 | Gurin | |
| 2009/0121495 A1 | 5/2009 | Mills | |
| 2012/0047891 A1 | 3/2012 | Rosenfeld | |
| 2013/0033044 A1* | 2/2013 | Wright | F02C 9/00 290/1 R |

OTHER PUBLICATIONS

Angelino, "Carbon Dioxide Condensation Cycles for Power Production," Contributed by the Gas Turbine Division for presentation at the Gas Turbine Conference, Washington, D.C., ASME Headquarters, Dec. 28, 1967, Paper No. 68-CT-23, 9 pages.

Angelino, "Perspectives for the Liquid Phase Compression Gas Turbine," Contributed by the Gas Turbine Conference and Products Show, Zurich, Switzerland, Mar. 13-17, 1966, of the American Society of Mechanical Engineers, Manuscript received at ASME Headquarters, Dec. 15, 1965, Paper No. 66-CT-111, 10 pages.

Angelino, Real Gas Effects in Carbon Dioxide Cycles, Contributed by the Gas Turbine Division of the American Society of Mechanical Engineers for presentation at the International Gas Turbine Conference & Products Show, Cleveland, Ohio,Mar. 10-13, 1969, 12 pages.

Dostal et al., "A Supercritical Carbon Dioxide Cycle for Next Generation Nuclear Reactors," Advanced Nuclear Power Technology Program, MIT-ANP-TR-100, Mar. 10, 2004, 160 pages, 1 of 2.

Dostal et al., "A Supercritical Carbon Dioxide Cycle for Next Generation Nuclear Reactors," Advanced Nuclear Power Technology Program, MIT-ANP-TR-100, Mar. 10, 2004, 165 pages, 2 of 2.

Muto et al., "Optimal Cycle Scheme of Direct Cycle Supercritical CO2 Gas Turbine for Nuclear Power Generation Systems," International Conference on Power Engineering 2007, Oct. 23-27, 2007, Hangzhou, China, 7 pages.

Fuller et al., "Turbomachinery for a Supercritical CO2 Electro-Thermal Energy Storage System," Proceedings of ASME Turbo Expo 2013: Turbine Technical Conference and Exposition GT2013, Jun. 3-7, 2013, San Antonio, Texas, GT2013-95112, 11 pages.

Jaroslav et al. "Thermoelectric Energy Storage based on Transcritical CO2 Cycle," Supercritical CO2 Power Cycle Symposium, May 24-25, 2011, Boulder, Colorado, 5 pages.

Mercangoz et al., "Electrothermal energy storage with transcritical CO2 cycles," Energy vol. 45 (2012), pp. 407-415, 9 pages.

Wright et al., "Control of a Supercritical CO2 Electro-Thermal Energy Storage System," Proceedings of ASME Turbo Expo 2013: Turbine Technical Conference and Exposition GT2013, Jun. 3-7, 2013, San Antonio, Texas, GT2013-95326, 9 pages.

* cited by examiner

SYSTEMS AND METHODS FOR POWER PEAKING WITH ENERGY STORAGE

CLAIM TO PRIORITY

This patent application claims priority from U.S. Provisional Patent Application Ser. No. 61/956,077, filed May 31, 2013, entitled "POWER PEAKING POWER PLANT WITH ENERGY STORAGE," listing Chal S. Davidson and Steven A. Wright as inventors, the entire contents of which are hereby incorporated by this reference.

APPLICATION DATA SHEET

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

This patent application claims priority from U.S. Provisional Patent Application Ser. No. 61/956,077, filed May 31, 2013, entitled "POWER PEAKING POWER PLANT WITH ENERGY STORAGE," listing Chal S. Davidson and Steven A. Wright as inventors, the entire contents of which are hereby incorporated by this reference.

RELATED APPLICATIONS

This patent application is a regular utility patent application that claims priority from U.S. Provisional Patent Application Ser. No. 61/956,077, filed May 31, 2013, entitled "POWER PEAKING POWER PLANT WITH ENERGY STORAGE," listing Chal S. Davidson and Steven A. Wright as inventors, the entire contents of which are hereby incorporated by this reference.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

The present disclosure relates in general to a thermodynamic cycle and, more particularly, to a thermodynamic cycle that provides power peaking using energy storage.

BACKGROUND

Some known thermal energy storage systems may store thermal energy in the form of ice and/or heat and, at some later time, may use the stored thermal energy to make electrical power. Some known types of thermal energy storage systems may incur inefficiencies because they use electricity to make ice. As a result, inefficiencies inherent therein may be incurred twice. Also, some known types of thermal energy storage systems may use one machine to buy electricity to charge hot and cold thermal heat sources (such as via a heat pump), then wait for some period of time before using another system to discharge the thermal energy storage tanks to make power. Moreover, in some known types of thermal energy storage systems, working fluid may flow in more than one direction and/or at more than one mass flow rate in components of the thermal energy storage system in different modes of operation.

SUMMARY

Disclosed illustrative embodiments include systems and methods for power peaking with energy storage.

In an illustrative, non-limiting embodiment, a power plant includes a thermodynamic piping circuit having a working fluid contained therein, and the working fluid has a flow direction and a flow rate. Power plant components are interposed in the thermodynamic piping circuit. The power plant components include a compressor system, a recuperator system, a heat source, a turbine system, a heat rejection system, and a thermal energy storage system. A valving system is operable to selectively couple the heat rejection system, the thermal energy storage system, and the compressor system in thermohydraulic communication with the working fluid maintaining the flow direction and the flow rate to implement a thermodynamic cycle chosen from a Brayton cycle, a combination Brayton cycle/refrigeration cycle, and a Rankine cycle.

In another illustrative, non-limiting embodiment, a power plant includes a compressor system structured to compress a working fluid. A recuperator system is structured to heat the compressed working fluid. A heat source is structured to further heat the heated compressed working fluid from the recuperator system. A turbine system is coupled to receive the further heated compressed working fluid from the heat source and is structured to convert a drop in enthalpy of working fluid to mechanical energy, and the recuperator system is further structured to cool expanded working fluid from the turbine system. A heat rejection system is structured to selectably cool expanded working fluid and provide the expanded working fluid cooled by the heat rejection system and is further structured to selectably provide the expanded working fluid without being cooled by the heat rejection system. A thermal energy storage system is structured to selectably further expand the working fluid and to selectively transfer thermal energy between the working fluid and a thermal energy storage medium and provide the working fluid to the compressor system.

In another illustrative, non-limiting embodiment, a method includes implementing a first thermodynamic cycle with power plant components interposed in a thermodynamic piping circuit having a working fluid contained therein, the working fluid having a flow direction and a flow rate, the power plant components including a compressor system, a recuperator system, a heat source, a turbine system, a heat rejection system, and a thermal energy storage system, the first thermodynamic cycle including a thermodynamic cycle chosen from a Brayton cycle, a combination Brayton cycle/refrigeration cycle, and a Rankine cycle. A valving system is operated to selectively couple the heat rejection system, the thermal energy storage system, and the compressor system in thermohydraulic communication with the working fluid maintaining the flow direction and the flow rate to implement a second thermodynamic cycle that is different from the first thermodynamic cycle, the second thermodynamic cycle chosen from a Brayton cycle, a combination Brayton cycle/refrigeration cycle, and a Rankine cycle.

In another illustrative, non-limiting embodiment, a method includes positioning a plurality of valves to operate a power plant with a working fluid having a flow rate and a flow direction to implement a combination Brayton cycle/refrigeration cycle to store thermal energy and generate electrical power during a first time period associated with a first level of demand for electrical power and a first price of electrical power. The plurality of valves are repositioned to operate the power plant with the working fluid having the flow rate and the flow direction to implement a Rankine cycle to recover the stored thermal energy during a second time period associated with a second level of demand for electrical power that is higher than the first level of demand for electrical power and a second price of electrical power that is higher than the first level of demand for electrical power. The plurality of valves are repositioned to operate the power plant with the working fluid having the flow rate and the flow direction to implement a Brayton cycle to generate electrical power.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
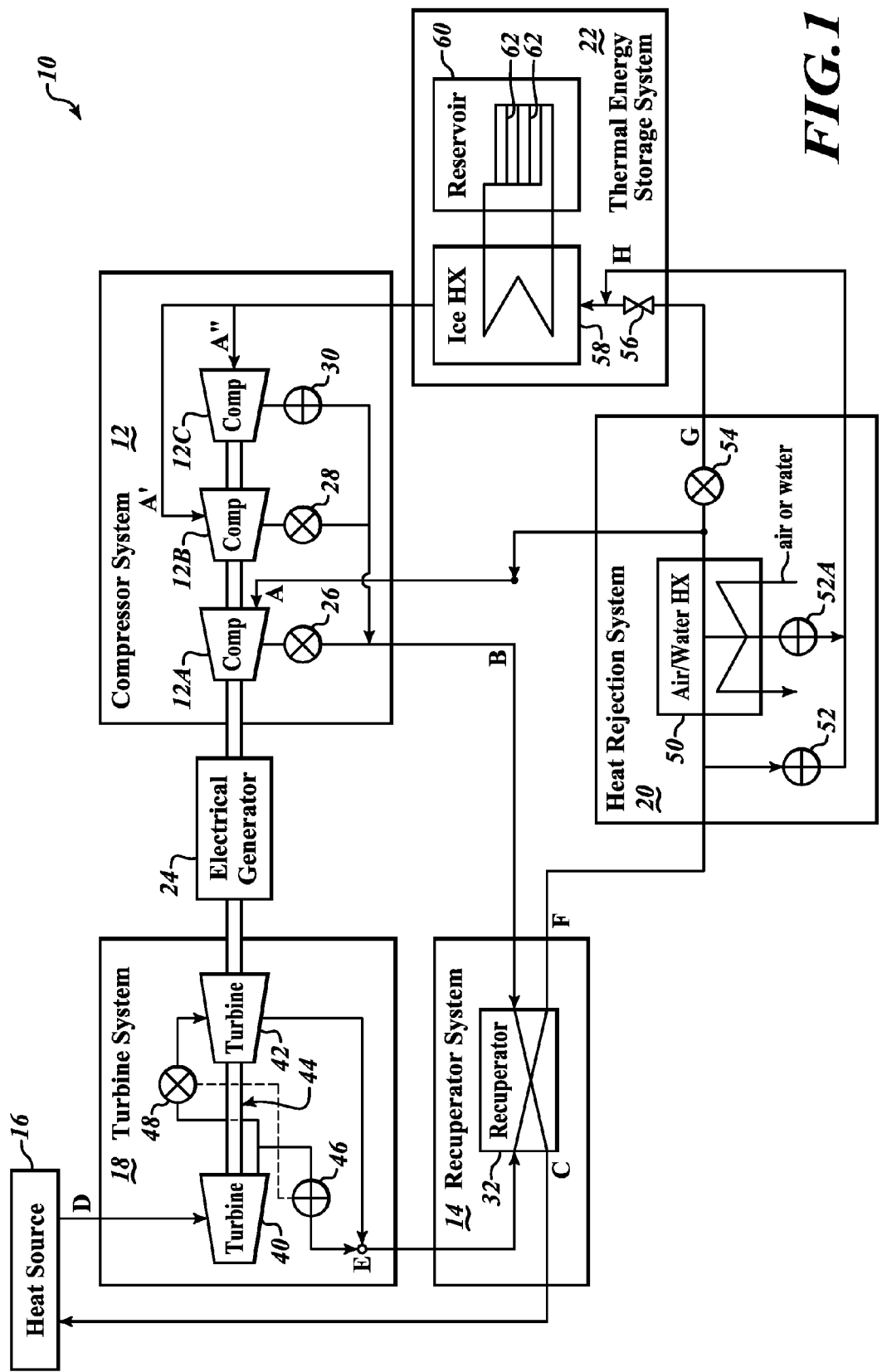
FIG. 1 is a block diagram in partial schematic form of an illustrative embodiment of a power plant.

In the following detailed description, reference is made to the accompanying drawings, which form a part hereof. In the drawings, similar symbols typically identify similar components, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Overview

Given by way of overview, disclosed illustrative embodiments include systems and methods for power peaking with energy storage.

Referring briefly to FIG. 1, in an illustrative embodiment given by way of non-limiting example, a power plant 10 includes a thermodynamic piping circuit having a working fluid contained therein, and the working fluid has a flow direction and a flow rate. Power plant components are interposed in the thermodynamic piping circuit. The power plant components include a compressor system 12, a recuperator system 14, a heat source 16, a turbine system 18, a heat rejection system 20, and a thermal energy storage system 22. A valving system is operable to selectively couple the heat rejection system 20, the thermal energy storage system 22, and the compressor system 12 in thermohydraulic communication with the working fluid maintaining the flow direction and the flow rate to implement a thermodynamic cycle chosen from a Brayton cycle, a combination Brayton cycle/refrigeration cycle, and a Rankine cycle.

Continuing by way of overview, illustrative embodiments of the power plant 10 generate electrical power by using a supercritical Brayton cycle, generate electrical power and store energy by making ice in a transcritical combination Brayton cycle/refrigeration cycle (sometimes referred to herein as a "Combined Cooling and Power cycle" or "CCP cycle" or a "charging mode"), and recover the stored thermal energy (that is, use the ice) in a transcritical Rankine cycle (sometimes referred to herein as a "discharging mode") as a very low temperature heat sink to help improve power cycle efficiency. The power plant 10 uses valves to select components of the compressor system 12, combinations with a heat exchanger of the heat rejection system 20, an expansion valve of the thermal energy storage system 22, and a heat exchanger of the thermal energy storage system 22 to store energy (that is, make ice) or recover the stored thermal energy (that is, melt ice).

Various embodiments entail use of carbon dioxide (CO2) as the working fluid. Carbon dioxide is a natural refrigerant (R744) that is non-toxic, non-flammable, can be heated to high temperatures without decomposing, and is inexpensive. Because of its refrigeration qualities, it can also be used in embodiments of the power plant 10 because CO2 is not subject to water freezing (as in steam systems or in other combustion gas driven systems such as gas turbines). However, it will be appreciated that other working fluids may be used as desired for a particular application.

Various embodiments entail use of water as the thermal energy storage medium. In such cases, storing thermal energy may sometimes be referred to as "making ice" and discharging thermal energy may sometimes be referred to as "melting ice."

The supercritical Brayton cycle produces electrical power only. The transcritical combination Brayton cycle/refrigeration cycle or CCP produces reduced amounts of electrical power compared to the Brayton cycle (reduced to about 35%) but simultaneously also operates as a refrigeration cycle to produce substantial amounts of ice (energy storage). The Rankine cycle uses the stored ice to lower the heat rejection temperature of the power plant 10 to increase the efficiency and power generation by using a transcritical Rankine cycle that condenses the working fluid near the freezing point of ice (0 C). The Rankine cycle or discharging mode produces substantially more power (about 70% more electricity) than the Brayton cycle mode. The specific mode of operation (Brayton, CCP/charging, or Rankine/discharging) to be used is chosen simply by opening and closing valves to direct the working fluid flow to the proper combinations of compressors, turbines, valves, and heat exchangers to provide the power generation, ice-generation, and ice-melting functions.

Continuing by way of overview, it will be appreciated that various embodiments of the power plant 10 may help present desirable attributes associated with energy storage and/or power peaking. As a first illustrative attribute, the majority of the hardware components may be re-used by all three cycle modes. The re-use of components is unlike many other types of thermal energy storage systems which use one machine to buy electricity to charge hot and cold thermal heat sources (such as via a heat pump), then wait for some period of time before using another system to discharge the thermal energy storage tanks to make power. Moreover, it will be appreciated that the fluid flow direction and mass flow rate in all the components are the same in all modes of operation (Brayton cycle, combination Brayton cycle/refrigeration cycle, and Rankine cycle).

As a second illustrative attribute, embodiments of the power plant 10 may reuse most of the major components for up to 24 hours per day (not just for short periods such as 8-10 hours for charging and 4-5 hours for discharging), up to seven days per week.

As a third illustrative attribute, it may not be not necessary to purchase electricity for the charging mode because excess thermal mechanical power (that is, shaft power) may be used to make ice. As a result, some inefficiencies of using electricity to make ice may not be incurred twice.

These three non-limiting, illustrative attributes (re-use of the majority of the hardware components, possibly continuous use (24 hours for 7 days per week), and the ability of the charging circuit to operate without purchasing electricity) may help to contribute to increasing the economics of embodiments of the power plant 10.

Continuing by way of overview, it will be appreciated that only ice storage is entailed in storing thermal energy in various embodiments of the power plant 10. That is, no high temperature storage system is required and no plant hardware is required for a high temperature storage system. Ice-only storage means the inefficiencies of energy storage are only attributed to one charging/discharging the ice-storage, not to charging/discharging the heat sink and heat source. To that end, the amount of energy storage is limited only by the size of the ice energy storage unit. For example and given by way of non-limiting embodiment, an illustrative ice energy storage unit may be sized to allow for around 10 hours or so of ice making (CCP cycle), while the ice-melting (Rankine) cycle may operate for around 5.7 hours or so. In this non-limiting example, the Brayton cycle may operate for the remaining 8.3 hours or so. Because of large swings in the spot market price of electricity, revenue for sales of electrical power for various embodiments of the power plant 10 may possibly be increased over that for conventional power plants. Moreover, only minimal increases in fuel usage may be entailed to make ice and store the ice energy over a period of 24 hours compared to the fuel usage to run a standard Brayton cycle for 24 hours. Typical increases in various embodiments may be around 1.8-2.5% or so.

Summing up by way of overview, in various embodiments of the power plant 10 energy is stored as ice or hot water and energy is generated in a transcritical CO2 refrigeration cycle to make ice from −5 C $CO_2$. In various embodiments of the power plant 10, the "charging" cycle may operate for 8 hours during the night and early morning when the demand and the price of electricity are low. The stored thermal energy may be recovered, or "discharged", over a period of about 4 hours during the early evening when peak power demands and the price of electricity are high. The stored energy plus additional energy from the waste heat stream are recovered because the power plant 10 is reconfigured such that the stored ice used as the heat rejection media. This cools the working fluid ($CO_2$) to +5 C by melting the ice. This also results in lowering the working fluid ($CO_2$) cold side pressure and condenses the working fluid ($CO_2$), which means that the discharge cycle operates as a Rankine cycle. As a result, the lower heat rejection temperature can help improve the efficiency, can help increase the power by about 70%, and can help to make more effective use of the waste heat. Early calculations indicate that for a waste heat flow stream representative of a gas turbine (538 C), the dispatchable round trip efficiency may be in the range from 148%-183%. The efficiency exceeds one because electricity is recovered from both the waste heat flow stream and from the stored energy. The excess dispatchable round trip efficiency is less than one. It is defined as the electricity generated above that of the power plant without using stored energy. It may vary from around 59-73% depending on how the power plant is configured.

Illustrative Embodiments of the Power Plant 10

Still referring to FIG. 1, in an illustrative embodiment given by way of non-limiting example, the power plant 10 includes the compressor system 12 structured to compress a working fluid. The recuperator system 14 is structured to heat the compressed working fluid. The heat source 16 is structured to further heat the heated compressed working fluid from the recuperator system 14. A turbine system 18 is coupled to receive the further heated compressed working fluid from the heat source 16 and is structured to convert a drop in enthalpy of working fluid to mechanical energy, and the recuperator system 14 is further structured to cool expanded working fluid from the turbine system 18. A heat rejection system 20 is structured to selectably cool expanded working fluid and provide the expanded working fluid cooled by the heat rejection system 20 and is further structured to selectably provide the expanded working fluid without being cooled by the heat rejection system 20. A thermal energy storage system 22 is structured to selectably further expand the working fluid and to selectively transfer thermal energy between the working fluid and a thermal energy storage medium and provide the working fluid to the compressor system 12.

Non-limiting details will be explained below by way of illustration and not of limitation.

The compressor system 12 is described first. It will be appreciated that the compressor pressure ratio for the three modes of operation (Brayton, CCP, and Rankine) all entail different pressure ratios. For example and given by way of illustration and not of limitation, in an illustrative embodiment the pressure ratio for the Brayton cycle may be around 3, the pressure ratio for the CCP cycle may be around 7.68, and the pressure ratio for the Rankine cycle may be around 5.89. Thus, FIG. 1 shows three compressors 12A, 12B, and 12C. It will be appreciated that any one or more of the compressors 12A, 12B, and 12C may have multiple stages, as desired for a particular application. It will also be appreciated that the compressors 12A, 12B, and 12C are valved-in or valved-out depending on which mode of operation (Brayton, CCP, or Rankine,) is used. The use of one compressor assembly to determine the compressor pressure ratio by valving the appropriate compressors "in" or "out" is used for purposes of illustration and not of limitation. For example, in another embodiment only the compressor 12A is used, and pre-compressor stages are arranged to provide proper overall pressure ratio. In either case, the net effect is to have three separate compressor assemblies that provide the proper pressure ratio and can operate at the varying inlet temperatures and densities. It will also be appreciated that compressor 12C (used with the Rankine cycle) may also be referred to herein as a "pump."

Figure 1A:
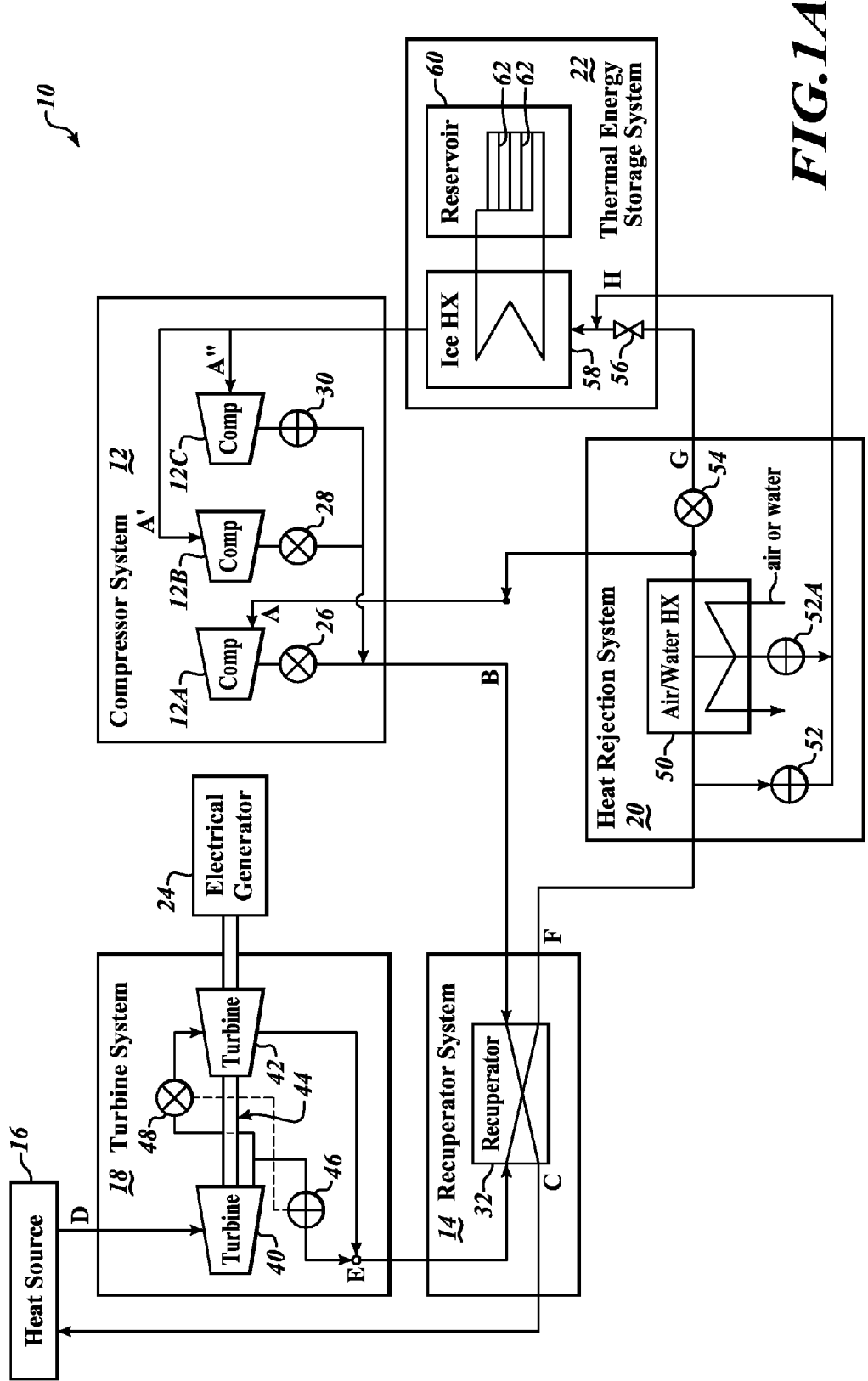
FIG. 1A is a block diagram in partial schematic form of another illustrative embodiment of a power plant.

In some embodiments, the compressors 12A, 12B, and 12C may be run via a common shaft with the turbine system 18. However, in some other embodiments (FIGS. 1A, 3A, and 4A) electricity may be used to run the compressor to make ice. For example, in various embodiments electricity may be provided to the compressor by an electrical generator 24 (described below), from the electrical grid, or from renewable electrical sources, as desired for a particular application. Electricity can be consumed by a motor to drive the compressors 12A, 12B, and/or 12C and continue the cooling cycle in the absence of combustion heat. This situation will be most valuable when the cost of electricity is very cheap. For example, on a sunny, windy day, a utility might have an excess production of energy from alternative sources that require either cheap sale on the wholesale market or collection for release later. This excess electricity can be used to run the refrigeration cycle of the power plant 10 and the energy can be saved in the form of ice—which may later be used to increase the cycle DT, reduce the vapor pressure on the back end of the turbine system 18, and hence increase the cycle efficiency.

The input of the compressor 12A (Brayton cycle) is coupled to an output of the heat rejection system 20 and the output of the compressor 12A is coupled to a high-pressure-side input of the recuperator system 14 via a valve 26. The input of the compressor 12B (CCP) is coupled to an output of the thermal energy storage system 22 and the output of the compressor 12B is coupled to the high-pressure-side input of the recuperator system 14 via a valve 28. The input of the compressor 12C (Rankine cycle) is coupled to an output of the thermal energy storage system 22 and the output of the compressor 12C is coupled to the high-pressure-side input of the recuperator system 14 via a valve 30.

The recuperator system 14 includes a recuperator 32. In various embodiments, the same recuperator (that is, the recuperator 32) suitably is used in all three modes of operation (Brayton cycle, CCP, and Rankine cycle). The mass flow rates and flow directions suitably are the same for all three modes of operation. However, the recuperator 32 suitably is sized to operate with the largest heat transfer requirements among the three operating modes. Thus, the size of the recuperator 32 depends on the design of the particular embodiment of the power plant 10. In particular, the size of the recuperator 32 depends on the approach temperature between the outlet of the compressor system 14 and the outlet temperature of the low pressure side of the recuperator 32. Given by way of non-limiting example, the CCP function entails a recuperator size that is about 30% larger than the recuperator size entailed for the Brayton cycle function. It will be appreciated that the recuperator 32 may be any acceptable type of recuperator as desired for a particular application.

Figure 2:
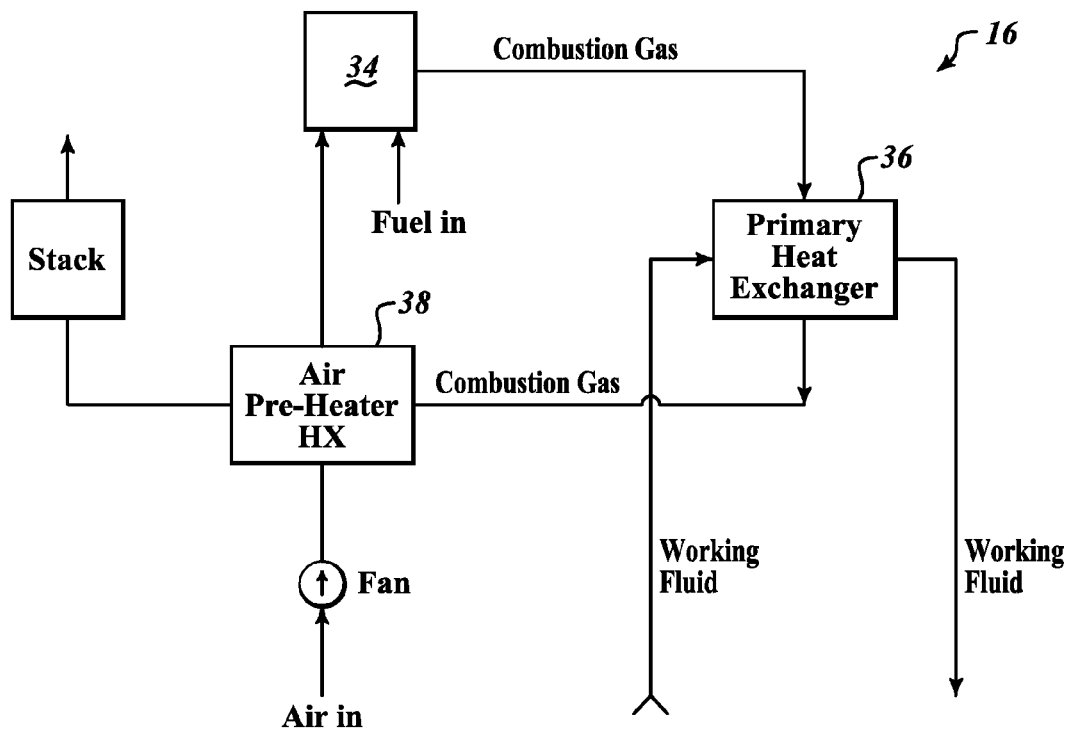
FIG. 2 is a block diagram in partial schematic form of a detail of a component of the power plant of FIG. 1.

The heat source 16 suitably may include any heat source as desired for a particular application. In various embodiments and given by way of non-limiting examples, the heat source 16 may include a combustion heat source, waste heat, a nuclear heat source, solar heat, or the like. Referring briefly to FIG. 2, in one non-limiting embodiment the heat source 16 may be a combustion heat source that includes a heater assembly 34. The heater assembly 34 suitably may use combustor such as a process heater, like a natural gas process heater. The high temperature combustion gas from the process heater heats the high pressure working fluid in a heat exchanger 36. In various embodiments, the heat source 16 suitably may include a heat exchanger that pre-heats air (before the air enters the heater assembly 34) with combustion gas that has exited the heat exchanger 36. The process heater and the heat exchanger 36 are used by all three modes of operation (Brayton cycle, CCP, and Rankine cycle). The size of the combustor and the heat exchanger 36 are based on the Rankine cycle because the Rankine cycle mode of operation entails the most thermal heat from the combustor (about 44%-55% larger than the Brayton cycle).

Referring back to FIG. 1, in various embodiments the turbine system 18 suitably includes a turbine 40 that is used in all modes of operation (Brayton cycle, CCP, and Rankine cycle). A turbine 42 is valved-in for the Rankine cycle mode of operation. The turbine 42 is used in the Rankine cycle mode of operation because the pressure ratio through the combined turbine system is higher than that in the Brayton cycle or CCP modes of operation. This higher pressure ratio is provided by using the turbine 42. It will be appreciated that in some embodiments the turbine 42 may not be needed in the CCP mode of operation (even though the compressor pressure ratio is higher than in the Brayton cycle mode of operation) because the turbine pressure ratio is the same as in the Brayton cycle mode of operation.

The turbines 40 and 42 suitably may be any acceptable type of turbomachinery as desired for a particular application. The turbines 40 and 42 suitably rotate about a common shaft 44. Working fluid is input to the turbine 40 from the heat source 16. Expanded working fluid is provided from the turbine 40 to the inlet of the low-pressure side of the recuperator 32 via a valve 46 and to the turbine 42 via a valve 48. Expanded working fluid is provided from the turbine 42 to the inlet of the low-pressure side of the recuperator 32.

The electrical generator 24 is rotatably coupled to the shaft 44. The electrical generator 24 suitably is any acceptable turbo-generator that generates electrical power as sized for a particular application.

Figure 3:
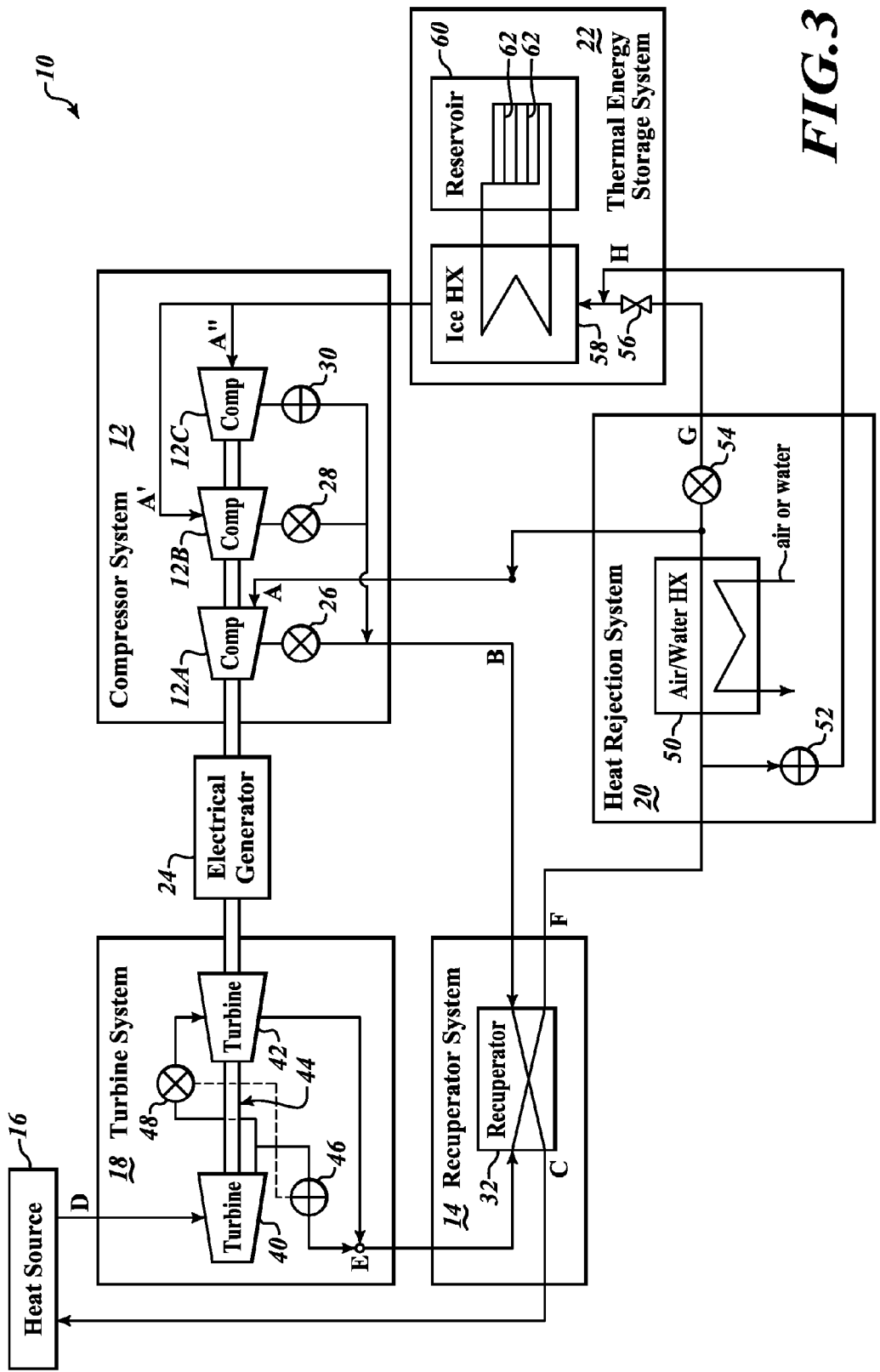
FIG. 3 is a block diagram in partial schematic form of another illustrative embodiment of a power plant.
Figure 3A:
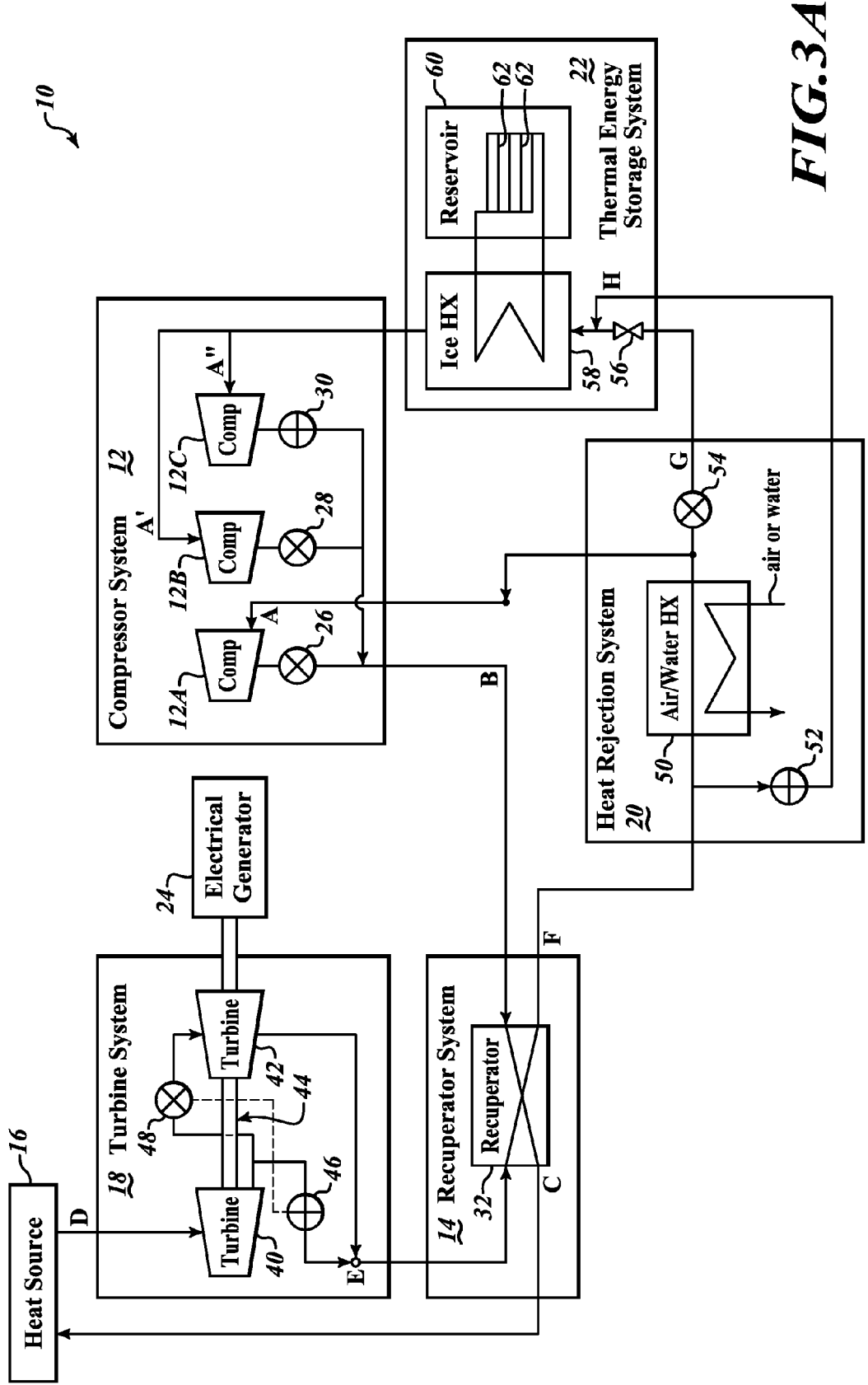
FIG. 3A is a block diagram in partial schematic form of another illustrative embodiment of a power plant.
Figure 4:
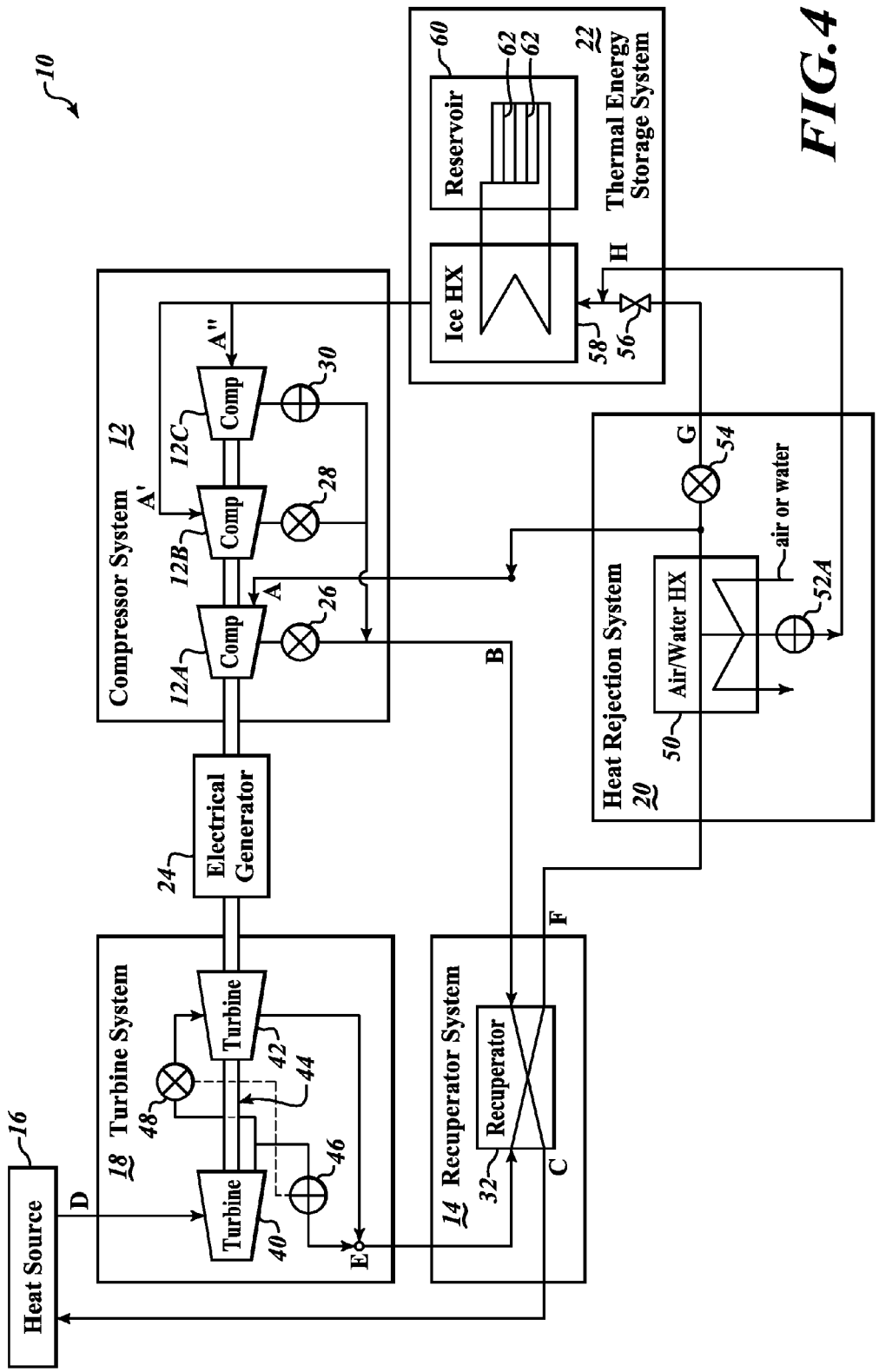
FIG. 4 is a block diagram in partial schematic form of another illustrative embodiment of a power plant.
Figure 4A:
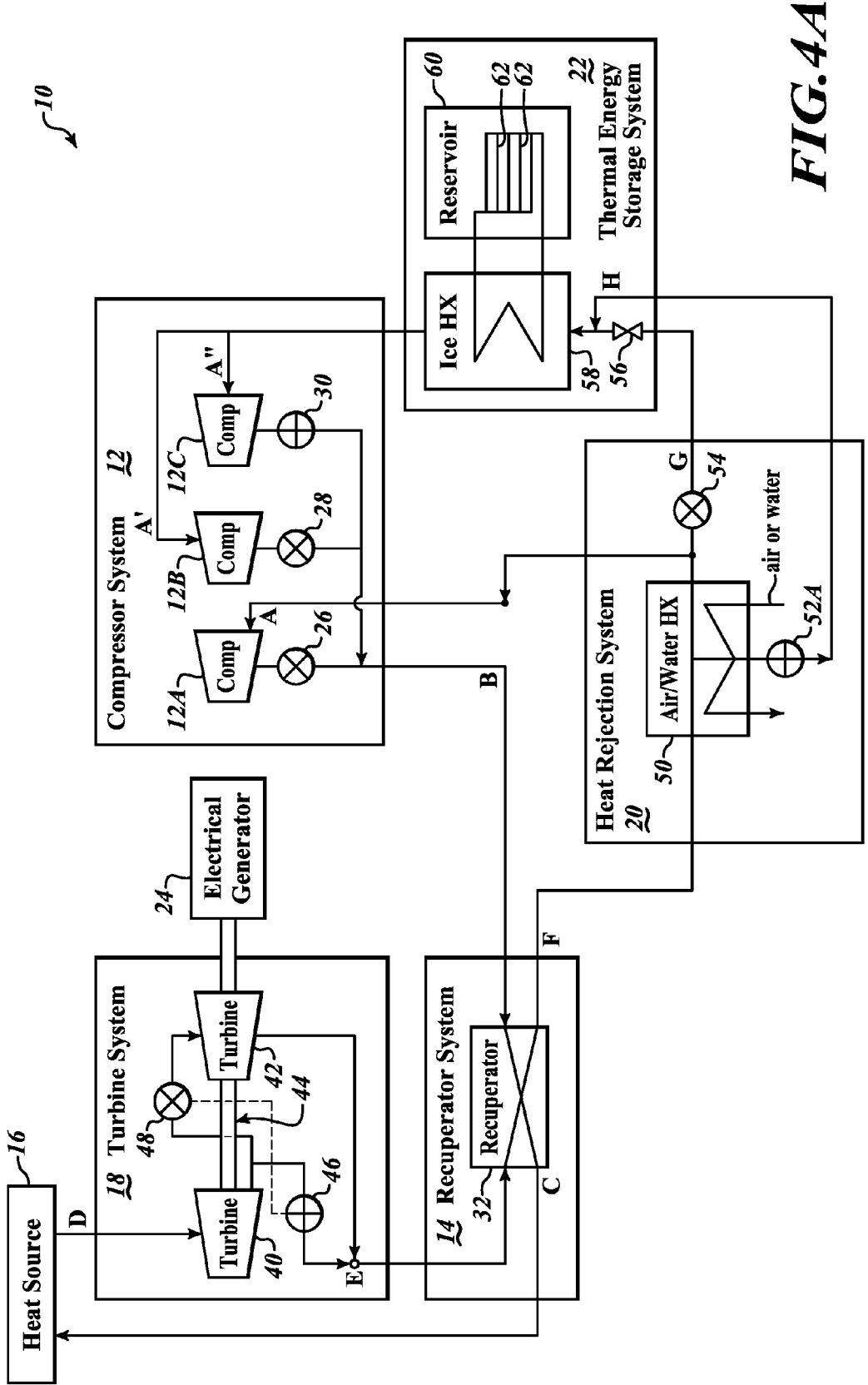
FIG. 4A is a block diagram in partial schematic form of another illustrative embodiment of a power plant.

In various embodiments, the heat rejection system 20 includes a heat exchanger 50. The heat exchanger 50 suitably may be a working fluid-to-air heat exchanger or a working fluid-to-water heat exchanger. As shown FIG. 1, in some embodiments a valve 52 is coupled to the working fluid inlet of the heat exchanger 50 to completely bypass the heat exchanger 50 if desired and a valve 52A is coupled to working fluid piping within the heat exchanger 50 to bypass a portion of the heat exchanger 50 if desired. A valve 54 is coupled to the working fluid outlet of the heat exchanger 50. The inlet of the compressor 12A is coupled to receive working fluid between the working fluid outlet of the heat exchanger 50 and the valve 54. Referring briefly to FIGS. 3 and 3A, in some other embodiments only the valve 52 is coupled to the working fluid inlet of the heat exchanger 50 to completely bypass the heat exchanger 50 if desired (and the valve 52A is not provided). Referring briefly to FIGS. 4 and 4A, in some other embodiments only the valve 52A is coupled to working fluid piping within the heat exchanger 50 to bypass a portion of the heat exchanger 50 if desired (and the valve 52 is not provided).

Referring back to FIGS. 1 and 1A, the heat rejection system 20 suitably may be used to reject waste heat as desired for a particular mode of operation. The heat rejection system 20 suitably may be used in all three modes of operation (Brayton/CCP/Rankine) However, the heat rejection system 20 is not needed in the ice-making (Rankine) cycle mode of operation. For the Brayton cycle mode of operation, the heat rejection system 20 is the only means to reject waste heat. For the CCP mode of operation, the heat exchanger 50 is used to lower the temperature of the working fluid prior to expanding the supercritical working fluid in an expansion valve in the thermal energy storage system (see below). For the Rankine cycle mode of operation, the heat exchanger 50 is completely bypassed via the valve 52 (FIGS. 1, 1A, 3 and 3A) or partially bypassed via the valve 52A (FIGS. 1, 1A, 4 and 4A), and the main heat sink is a reservoir in the thermal energy storage system (see below). It will be appreciated that during most operating conditions the heat exchanger 50 can also be used reject heat prior to melting the thermal energy storage medium (such as ice). When this is done, the thermal energy storage medium within the thermal energy storage system 22 is melted at a much lower rate. Thus, time or duration of operation in the efficient, high power Rankine cycle mode of operation can be greatly increased. This is the reason for the alternative heat removal connection in the heat exchanger 50 as provided by the valve 52A (FIGS. 1 and 4). Thus, the heat exchanger 50 may be used in all three modes of operation (Brayton/CCP/Rankine), even though the Rankine cycle mode suitably may operate without it.

In various embodiments the thermal energy storage system 22 includes an expansion device 56 (such as an expansion valve), a heat exchanger 58, and a reservoir 60. The expansion device 56 may be any acceptable expansion device, such as an expansion valve. The heat exchanger 58 may be any acceptable type of heat exchanger as desired for a particular application. The heat exchanger 58 includes one side for working fluid and another side for the thermal energy storage medium. The reservoir 60 may be any type of reservoir for containing the thermal energy storage medium. In various embodiments, the reservoir 60 may be a tank, a lakebed or the like, terrain, and the like. In various embodiments the reservoir 60 suitably includes tubes 62 that contain the thermal energy storage medium.

The expansion device 56 expands the medium pressure working fluid that exits the recuperator 32 to a lower pressure and temperature. This expansion lowers the pressure and temperature and results in a very cold (around $-5$ C), two phase working fluid (such as $CO_2$) that is used to freeze the thermal energy storage medium (such as water) in the reservoir 60. When the working fluid is below 0 C, it will freeze the thermal energy storage medium (such as water). The actual working fluid expansion temperature is selected by design area of the heat exchanger 58 because the area determines the temperature difference (dT) between the working fluid and the thermal energy storage medium (such as ice) (which is always kept at 0 C). In some embodiments $-5$ C is used as the temperature difference, but the temperature difference could be $-2$ C if the area of the heat exchanger 58 is sufficiently large. Lowering this temperature difference has a strong effect on the amount of entropy lost in the heat exchanger 58 and, thus, strongly impacts the round trip efficiency. At 2 C the round trip efficiency can be as large as 75%. The working fluid (such as $CO_2$) exiting the reservoir 60 is arranged by design to be a saturated vapor at $-5$ C. Therefore, it has a relatively low vapor pressure (about 30 bar, compared to the pressure of 75 bar for the inlet of the compressor inlet 12B). The lower inlet pressure to the compressor 12C therefore entails a larger pressure ratio in the compressor system 12.

Modes of Operation

The various modes of operation of the power plant 10 will be discussed below. For each mode of operation, the positions of valves entailed in configuring the power plant 10 for the selected mode of operation will be discussed, followed by an explanation of a temperature-entropy (T-S) diagram for the selected mode of operation.

In the temperature-entropy diagrams discussed below, it will be appreciated that the high-pressure leg of the power/heat cycle is substantially identical for all three modes of operation from the outlet of the compressor system 12 through the peak exit temperature from the heat source 16. This is why the heat exchanger 50 and the turbine 40 can be used in all modes of operation of the power plant 10. In addition, as discussed above, the expansion in the stages of the turbine 40 is substantially the same for the high-pressure expansion phase (pressure ratio of about 3/1) but is larger for the Rankine cycle mode of operation (which entails the secondary "low" pressure turbine 42 in addition to the turbine 40).

Referring now to FIGS. 1, 3, and 4, the Brayton mode of operation (power generation only) will be discussed. The Brayton mode of operation is configured by positioning shut the valves 28, 30, 52 (and/or 52A), and 54 and positioning open the valves 26 and 46. It will be noted that valve positions shown on FIGS. 1, 3, and 4 may or may not correspond to the valve positions described immediately above for this particular mode of operation.

Figure 5:
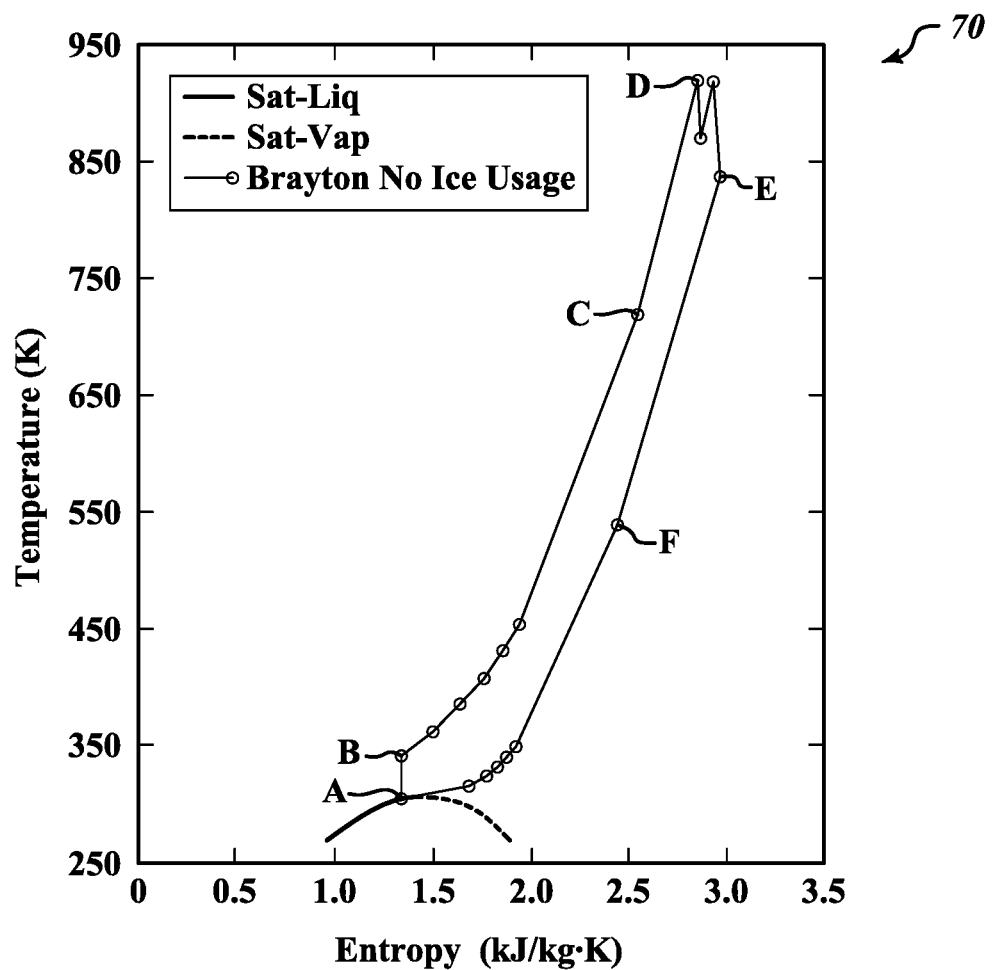
FIG. 5 is a graph of entropy versus temperature for a thermodynamic cycle implemented by the power plant of FIGS. 1, 1A, 3, 3A, 4, and 4A.

Referring additionally to FIG. 5, a curve 70 plots entropy (in Kj/kg-K) along an x-axis versus temperature (in degrees K) along a y-axis for an illustrative Brayton mode of operation as implemented by an illustrative embodiment of the power plant 10. It will be appreciated that values for entropy and temperature are given by way of illustration only and not of limitation. In the discussion below, phases of the thermodynamic cycle illustrated in FIG. 5 are mapped to corresponding components of the power plant 10 that may implement phases associated therewith. Alphabetic references (indicated in FIGS. 1, 3, 4, and 5) are made to relate phases of the cycle illustrated in FIG. 5 to associated components illustrated in FIGS. 1, 3, and 4.

Referring now to FIGS. 1, 3, 4, and 5, between points A and B temperature of the working fluid is raised in a nearly substantially isentropic process as pressure of the working fluid is raised in the compressor 12A (approximating the well-known relationship PV=nRT). Between points B and C temperature and enthalpy of the working fluid are raised between the high-pressure inlet of the recuperator 32 and the high-pressure outlet of the recuperator 32. Between points C and D temperature of the working fluid is raised by the heat source 16. Between points D and E temperature of the working fluid is lowered in a nearly substantially isentropic process as the working fluid is expanded, and the pressure thereof is reduced accordingly, in the turbine 40. It will be noted that FIG. 5 shows, by way of illustration only and not of limitation, two stages of expansion in the turbine 40. Between points E and F temperature and enthalphy of the working fluid are reduced between the low-pressure inlet of the recuperator 32 and the low-pressure outlet of the recuperator 32. Between points F and A temperature and enthalpy of the working fluid are further reduced by the heat exchanger 50.

It will be appreciated that in some embodiments the working fluid (such as CO2) may remain in the supercritical state during all phases of the thermodynamic cycle shown in FIG. 5. However, it will be appreciated that, at one or more points during the process shown along the curve 70 a state other than a supercritical state may exist. Nonetheless, for sake of simplicity, reference is only made to the working fluid as a supercritical working fluid (or, in some embodiments, supercritical CO2 or sCO2) as opposed to a fluid having one or more properties other than that of a supercritical fluid. To that end, as used herein, "supercritical" fluid refers to a fluid that is in a supercritical state during one or more operational portions of a cycle.

Referring now to FIGS. 1, 3, and 4, the combination Brayton cycle/refrigeration cycle (CCP, or ice making) mode of operation will be discussed. The combination Brayton cycle/refrigeration cycle mode of operation is configured by positioning shut the valves 26, 30, 48, and 52 (and/or 52A), and positioning open the valves 28 and 46. It will be noted that valve positions shown on FIGS. 1, 3, and 4 may or may not correspond to the valve positions described immediately above for this particular mode of operation.

Figure 6:
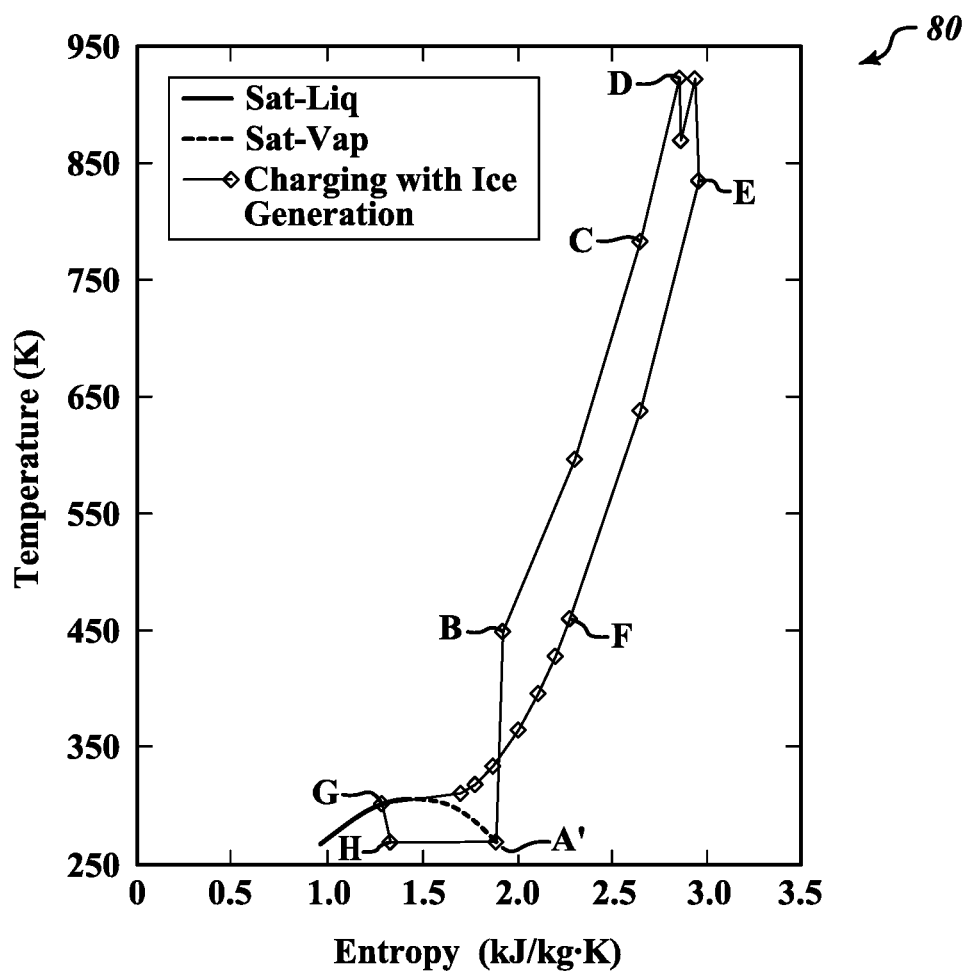
FIG. 6 is a graph of entropy versus temperature for another thermodynamic cycle implemented by the power plant of FIGS. 1, 1A, 3, 3A, 4, and 4A.

Referring additionally to FIG. 6, a curve 80 plots entropy (in Kj/kg-K) along an x-axis versus temperature (in degrees K) along a y-axis for an illustrative combination Brayton cycle/refrigeration cycle mode of operation as implemented by an illustrative embodiment of the power plant 10. It will be appreciated that values for entropy and temperature are given by way of illustration only and not of limitation. In the discussion below, phases of the thermodynamic cycle illustrated in FIG. 6 are mapped to corresponding components of the power plant 10 that may implement phases associated therewith. Alphabetic references (indicated in FIGS. 1, 3, 4, and 6) are made to relate phases of the cycle illustrated in FIG. 6 to associated components illustrated in FIGS. 1, 3, and 4.

Referring now to FIGS. 1, 3, 4, and 6, between points A' and B temperature of the working fluid is raised in a nearly substantially isentropic process as pressure of the working fluid is raised in the compressor 12B (approximating the well-known relationship PV=nRT). Between points B and C temperature and enthalpy of the working fluid are raised between the high-pressure inlet of the recuperator 32 and the high-pressure outlet of the recuperator 32. Between points C and D temperature of the working fluid is raised by the heat source 16. Between points D and E temperature of the working fluid is lowered in a nearly substantially isentropic process as the working fluid is expanded, and the pressure thereof is reduced accordingly, in the turbine 40. It will be noted that FIG. 6 shows, by way of illustration only and not of limitation, two stages of expansion in the turbine 40. Between points E and F temperature and enthalphy of the working fluid are reduced between the low-pressure inlet of the recuperator 32 and the low-pressure outlet of the recuperator 32. Between points F and G temperature and enthalphy of the working fluid are further reduced by the heat exchanger 50. Between points G and H temperature of the working fluid is lowered in a nearly substantially isentropic process as the working fluid is expanded, and the pressure thereof is reduced accordingly, by the expansion device 56. Between points H and A' enthalpy of the working fluid is increased in a substantially isothermal process as thermal energy is transferred from the thermal energy storage medium to the working fluid in the heat exchanger 58.

It will be appreciated that the temperature-entropy diagram shown in FIG. 6 for the CCP mode of operation is unconventional. In various embodiments, the exit temperature from the heat exchanger 50 is around 305 K (89 F)—the same as used in the Brayton cycle mode of operation. When an air-CO2 gas chiller is used as the heat exchanger 50, during portions of the year the ambient temperature of the gas chiller can be significantly below The duration of operation for the Rankine cycle (ice-melting), which has the greatest profit margin, can be increased by using ambient heat rejection (available in the heat exchanger 50) to reduce the rate of ice-melting, whenever the ambient air or water temperature is below about 89 F. When these conditions occur, it will be possible to further lower the temperature of the CO2 prior to expansion. This further lowering can result in producing a two-phase fluid with a greater liquid fraction. It will also allow the heat exchanger 58 to remove more energy from the thermal energy storage medium (such as water), thereby making more ice (provided the reservoir 60 is large enough). It also opens up the possibility of providing one more ways to control the power plant 10 in the CCP mode of operation—because the exit temperature could be allowed to float so long as it is below the ice-freezing point.

It will be appreciated that, at one or more points during the process shown along the curve 80, a state other than a supercritical state may exist. Therefore, for sake of simplicity, reference is made to the thermodynamic cycle as a transcritical cycle. At one or more points during the process shown along the curve 80, the working fluid may be a supercritical working fluid (or, in some embodiments, supercritical CO2 or sCO2). However, at some other points during the process shown along the curve 80 (such as between the points G and H, H and A', and a portion of the way between A' and B) the working fluid may have a state other than a supercritical state.

Referring now to FIGS. 1, 3, and 4, the Rankine cycle (discharging, or ice melting) mode of operation (power generation only) will be discussed. The Rankine cycle mode of operation is configured by positioning shut the valves 26, 28, 46, and 54, and positioning open the valves 30, 48, and 52 (and/or 52A). It will be noted that valve positions shown on FIGS. 1, 3, and 4 may or may not correspond to the valve positions described immediately above for this particular mode of operation.

Figure 7:
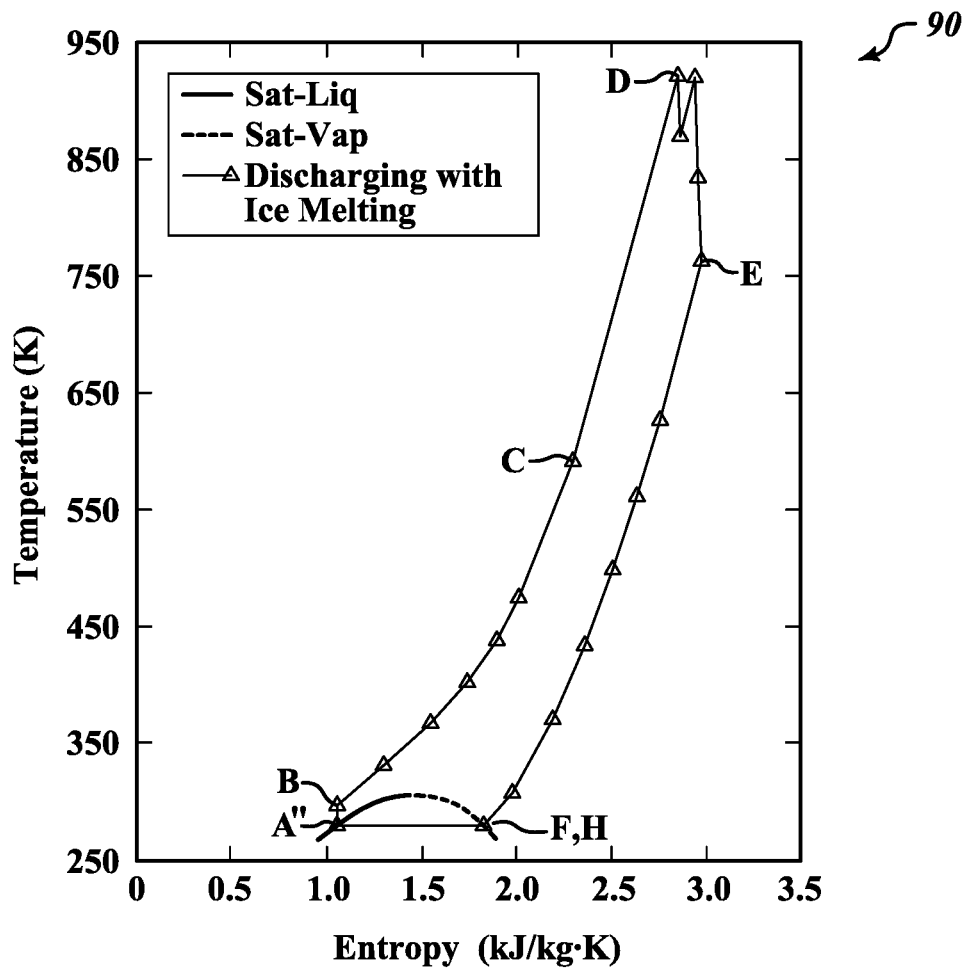
FIG. 7 is a graph of entropy versus temperature for another thermodynamic cycle implemented by the power plant of FIGS. 1, 1A, 3, 3A, 4, and 4A.

Referring additionally to FIG. 7, a curve 90 plots entropy (in Kj/kg-K) along an x-axis versus temperature (in degrees K) along a y-axis for an illustrative Rankine cycle mode of operation as implemented by an illustrative embodiment of the power plant 10. It will be appreciated that values for entropy and temperature are given by way of illustration only and not of limitation. In the discussion below, phases of the thermodynamic cycle illustrated in FIG. 7 are mapped to corresponding components of the power plant 10 that may implement phases associated therewith. Alphabetic references (indicated in FIGS. 1, 3, 4, and 7) are made to relate phases of the cycle illustrated in FIG. 7 to associated components illustrated in FIGS. 1, 3, and 4.

Referring now to FIGS. 1, 3, 4, and 7, between points A" and B temperature of the working fluid is raised in a nearly substantially isentropic process as pressure of the working fluid is raised in the pump 12C (approximating the well-known relationship PV=nRT). Between points B and C temperature and enthalpy of the working fluid are raised between the high-pressure inlet of the recuperator 32 and the high-pressure outlet of the recuperator 32. Between points C and D temperature of the working fluid is raised by the heat source 16. Between points D and E temperature of the working fluid is lowered in a nearly substantially isentropic process as the working fluid is expanded, and the pressure thereof is reduced accordingly, in the turbine 40. It will be noted that FIG. 7 shows, by way of illustration only and not of limitation, two stages of expansion in the turbine 40. Between points E and F (and H) temperature and enthalpy of the working fluid are reduced between the low-pressure inlet of the recuperator 32 and the low-pressure outlet of the recuperator 32. Between points F (and H) and A" enthalpy of the working fluid is lowered in a substantially isothermal process as thermal energy is transferred from the working fluid to the thermal energy storage medium in the heat exchanger 58.

It will be appreciated that, at one or more points during the process shown along the curve 90, a state other than a supercritical state may exist. Therefore, for sake of simplicity, reference is made to the thermodynamic cycle as a transcritical cycle. At one or more points during the process shown along the curve 90, the working fluid may be a supercritical working fluid (or, in some embodiments, supercritical CO2 or sCO2). However, at some other points during the process shown along the curve 90 (such as between the points F, H and A") the working fluid may have a state other than a supercritical state.

Associated Methods

Illustrative methods associated with embodiments of the power plant 10 will be discussed by way of illustration and not of limitation.

In an illustrative embodiment, a method includes implementing a first thermodynamic cycle with power plant components interposed in a thermodynamic piping circuit having a working fluid contained therein, the working fluid having a flow direction and a flow rate, the power plant components including a compressor system, a recuperator system, a heat source, a turbine system, a heat rejection system, and a thermal energy storage system, the first thermodynamic cycle including a thermodynamic cycle chosen from a Brayton cycle, a combination Brayton cycle/refrigeration cycle, and a Rankine cycle. A valving system is operated to selectively couple the heat rejection system, the thermal energy storage system, and the compressor system in thermohydraulic communication with the working fluid maintaining the flow direction and the flow rate to implement a second thermodynamic cycle that is different from the first thermodynamic cycle, the second thermodynamic cycle chosen from a Brayton cycle, a combination Brayton cycle/refrigeration cycle, and a Rankine cycle.

In some embodiments, operating a valving system to implement a Brayton cycle and operating a valving system to implement a combination Brayton cycle/refrigeration cycle may include positioning selected valves to cause working fluid to flow in the flow direction at the flow rate to transfer heat between the working fluid and a heat transfer medium in a first heat exchanger in the heat rejection system.

In some embodiments, operating a valving system to implement a Brayton cycle may further include positioning selected valves to cause working fluid to flow in the flow direction at the flow rate to provide the expanded working fluid cooled by the first heat exchanger to the compressor system only.

In some embodiments, operating a valving system to implement a combination Brayton cycle/refrigeration cycle may further include positioning selected valves to cause working fluid to flow in the flow direction at the flow rate to provide the expanded working fluid cooled by the first heat exchanger to the compressor system and to an expansion device of the thermal energy storage system, to transfer heat in a second heat exchanger from a thermal energy storage medium to the working fluid further expanded by the expansion device of the thermal energy storage, and to provide the further expanded working fluid cooled by the second heat exchanger to the compressor system.

In some embodiments, operating a valving system to implement a Rankine cycle may include positioning selected valves to cause working fluid to flow in the flow direction at the flow rate to provide expanded working fluid to the thermal energy storage system without further expansion of the working fluid by an expansion device of the thermal energy storage system.

In some embodiments, operating a valving system to implement a Rankine cycle may further include positioning selected valves to cause working fluid to flow in the flow direction at the flow rate to provide expanded working fluid to the thermal energy storage system without cooling of the working fluid by a first heat exchanger of the heat rejection system and without further expansion of the working fluid by an expansion device of the thermal energy storage system.

In some embodiments, operating a valving system to implement a Rankine cycle may further include positioning selected valves to cause working fluid to flow in the flow direction at the flow rate to provide expanded working fluid to the thermal energy storage system with cooling of the working fluid by a first heat exchanger of the heat rejection system and without further expansion of the working fluid by an expansion device of the thermal energy storage system.

In some embodiments, the method may further include generating electrical power with an electrical generator rotatably coupled to the turbine system.

In some embodiments, the working fluid may include carbon dioxide.

In some embodiments, the thermal energy storage medium may include water.

In some other embodiments, a method includes positioning a plurality of valves to operate a power plant with a working fluid having a flow rate and a flow direction to implement a combination Brayton cycle/refrigeration cycle to store thermal energy and generate electrical power during a first time period associated with a first level of demand for electrical power and a first price of electrical power. The plurality of valves is repositioned to operate the power plant with the working fluid having the flow rate and the flow direction to implement a Rankine cycle to recover the stored thermal energy during a second time period associated with a second level of demand for electrical power that is higher than the first level of demand for electrical power and a second price of electrical power that is higher than the first level of demand for electrical power. The plurality of valves is repositioned to operate the power plant with the working fluid having the flow rate and the flow direction to implement a Brayton cycle to generate electrical power.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A power plant comprising:
   a thermodynamic piping circuit having a working fluid contained therein, the working fluid having a flow direction and a flow rate;
   power plant components interposed in the thermodynamic piping circuit, the power plant components including a compressor system, a recuperator, a heat source, a turbine system, a first heat exchanger, and a thermal energy storage system including a reservoir configured to contain therein a thermal energy storage medium, a second heat exchanger configured to transfer heat between the working fluid and the thermal energy storage medium contained in the reservoir, and an expansion device configured to further expand the working fluid from the first heat exchanger and provide the further expanded working fluid to the second heat exchanger; and
   a valving system operable to selectively couple the first heat exchanger, the thermal energy storage system, and the compressor system in thermohydraulic communication with the working fluid maintaining the flow direction and the flow rate to implement a thermodynamic cycle chosen from a Brayton cycle, a combination Brayton cycle/refrigeration cycle operable to freeze at least a portion of the thermal energy storage medium, and a Rankine cycle operable to melt at least a portion of frozen thermal energy storage medium.

2. The power plant of claim 1, wherein the first heat exchanger is coupled to provide the expanded working fluid cooled by the first heat exchanger to the compressor system.

3. The power plant of claim 1, wherein the reservoir includes at least one tube configured to contain therein the thermal energy storage medium.

4. The power plant of claim 1, wherein the first heat exchanger is coupled to provide the expanded working fluid cooled by the first heat exchanger to the compressor system and is couplable via the valving system to provide the expanded working fluid cooled by the first heat exchanger to the expansion device of the thermal energy storage system.

5. The power plant of claim 1, wherein the valving system is configured to provide expanded working fluid to the second heat exchanger with partial cooling of the working fluid by the first heat exchanger and without further expansion of the working fluid by the thermal energy storage system.

6. The power plant of claim 1, wherein the valving system is furthered configured to provide expanded working fluid to the second heat exchanger without cooling of the working fluid by the first heat exchanger and without further expansion of the working fluid by the thermal energy storage system.

7. The power plant of claim 1, further comprising an electrical generator rotatably coupled to the turbine system.

8. The power plant of claim 1, wherein the compressor system is rotatably coupled to the turbine system.

9. The power plant of claim 1, wherein the compressor system is not rotatably coupled to the turbine system.

10. The power plant of claim 1, wherein the working fluid includes carbon dioxide.

11. The power plant of claim 1, wherein the thermal energy storage medium includes water.

12. A power plant comprising:
    a compressor system structured to compress a working fluid;
    a recuperator structured to heat the compressed working fluid;
    a heat source structured to further heat the heated compressed working fluid from the recuperator;
    a turbine system coupled to receive the further heated compressed working fluid from the heat source and structured to convert a drop in enthalpy of working fluid to mechanical energy, the recuperator being further structured to cool expanded working fluid from the turbine system;
    a first heat exchanger structured to cool expanded working fluid and coupled to provide the expanded working fluid cooled by the first heat exchanger to the compressor system;
    a thermal energy storage system including an expansion device structured to selectably further expand the working fluid and a second heat exchanger structured to transfer thermal energy between the working fluid and a thermal energy storage medium and coupled to provide the working fluid to the compressor system; and
    a valving system operable to selectably provide the expanded working fluid cooled by the first heat exchanger to the thermal energy storage system and further operable to selectably provide the expanded working fluid to the thermal energy storage system without being cooled by the first heat exchanger.

13. The power plant of claim 12, wherein:
a reservoir is configured to contain therein the thermal energy storage medium; and
the second heat exchanger is configured to transfer heat between the working fluid and the thermal energy storage medium contained in the reservoir.

14. The power plant of claim 13, wherein the reservoir includes at least one tube configured to contain therein the thermal energy storage medium.

15. The power plant of claim 13, wherein the thermal energy storage system further includes an expansion device configured to further expand the working fluid from the first heat exchanger and provide the further expanded working fluid to the second heat exchanger.

16. The power plant of claim 15, wherein the first heat exchanger is coupled to provide the expanded working fluid cooled by the first heat exchanger to the compressor system and is couplable via the valving system to provide the expanded working fluid cooled by the first heat exchanger to the expansion device of the thermal energy storage system.

17. The power plant of claim 13, wherein the valving system is configured to provide expanded working fluid to the second heat exchanger with partial cooling of the working fluid by the first heat exchanger and without further expansion of the working fluid by the thermal energy storage system.

18. The power plant of claim 13, wherein the valving system is furthered configured to provide expanded working fluid to the second heat exchanger without cooling of the working fluid by the first heat exchanger and without further expansion of the working fluid by the thermal energy storage system.

19. The power plant of claim 12, further comprising an electrical generator rotatably coupled to the turbine system.

20. The power plant of claim 12, wherein the compressor system is rotatably coupled to the turbine system.

21. The power plant of claim 12, wherein the compressor system is not rotatably coupled to the turbine system.

22. The power plant of claim 12, wherein the working fluid includes carbon dioxide.

23. The power plant of claim 12, wherein the thermal energy storage medium includes water.

* * * * *